May 10, 1949.
H. G. STONE
2,469,704
CONTINUOUS PROCESS OF PRODUCING BETA LACTONES AT REDUCED PRESSURE
Filed April 6, 1946
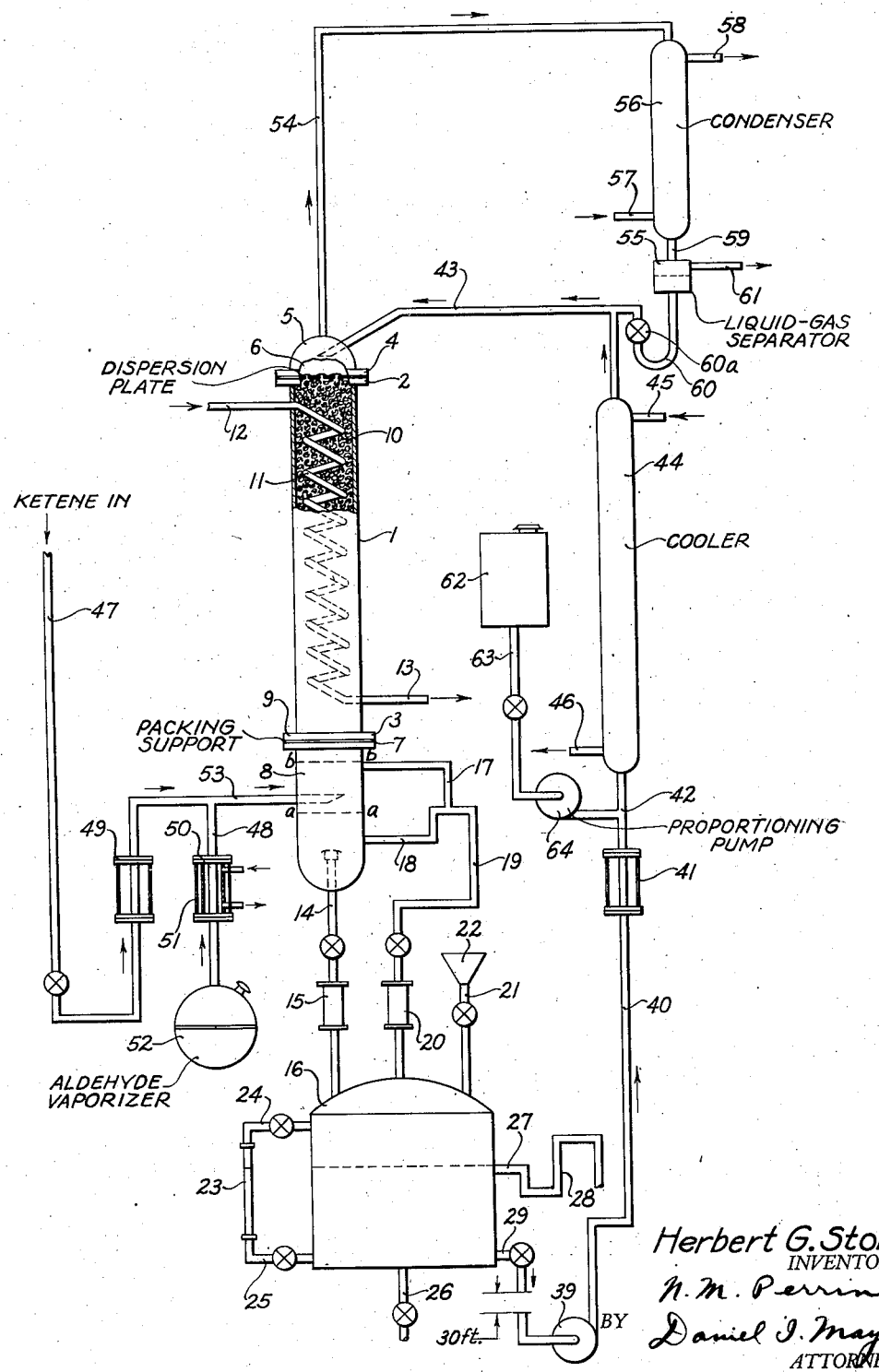
Herbert G. Stone
INVENTOR
BY N. M. Perrins
Daniel J. Mayne
ATTORNEYS Patented May 10, 1949

2,469,704

UNITED STATES PATENT OFFICE 2,469,704

CONTINUOUS PROCESS OF PRODUCING BETA LACTONES AT REDUCED PRESSURE

Herbert G. Stone, Kingsport, Tenn., assignor to Eastman Kodak Company, Rochester, N. Y., a corporation of New Jersey Application April 6, 1946, Serial No. 660,285

5 Claims. (Cl. 260—344)

1

This invention relates to the production of beta lactones and more particularly to an improved continuous cyclic process wherein beta lactones may be produced in satisfactory commercial yields and with a minimum of loss by conversion to polymerized or resinified products.

As is known, beta lactones may be formed by condensation of ketenes with carbonyl groups in aldehydes and ketones in accordance with the following graphic formula:

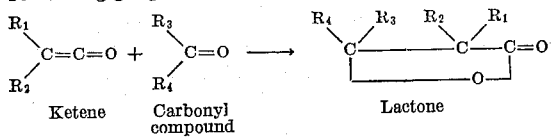

wherein $R_1$, $R_2$, $R_3$ and $R_4$ are hydrogen or hydrocarbon radicals.

Since this reaction is exothermic and liberates a considerable quantity of heat, a number of problems arise in connection with the production of beta lactones on a commercial scale and in satisfactory yields. For example, the desired condensation reaction between the ketene and the carbonyl-containing compound is competing with the tendency of the carbonyl compound to condense with itself and with the polymerization of the ketene to a diketene. If the reaction temperature is not effectively controlled, the increase in heat brought about by these undesired reactions, particularly the polymerization of ketene to diketene, which is highly exothermic, will result in an increase in temperature which will operate to accelerate such undesired reactions. Furthermore, if during the condensation reaction high local concentrations of ketene or carbonyl compound develop, the amount of polymerization or dimerization increases, with the result that the quality and yield of the desired beta lactone is adversely affected.

A still further reaction can contribute to reduction of the yield and contamination of the product in that, not only does ketene tend to dimerize in the reactor, but also tends to condense with the aldehyde present to form alpha, beta unsaturated ketones (Boese, U. S. 2,108,427), in accordance with the following equation:

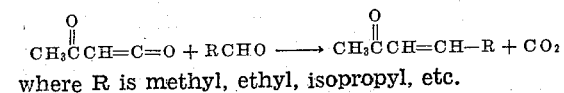

where R is methyl, ethyl, isopropyl, etc.

With formaldehyde diketene forms a resinous composition (Boese, U. S. 2,105,461).

Because of the difficulty of controlling the reaction, beta lactones have heretofore been prepared by a batch procedure in which control has been effected by the use of diluents, the object being to reduce the volume of the reacting mass and thus more readily control the temperature of the reaction. This method is, of course, uneconomical and has not resulted in the elimination of the above-mentioned drawbacks, although it has been recognized that because of the great reactivity of ketene and the lower aldehydes and their tendency to polymerize or decompose, and because of the relative instability of beta lactones, it is desirable to carry out the reaction under low temperatures and subsequently to isolate the product by distillation under reduced pressure. It will, of course, be readily recognized that carrying out the reaction in a large body of diluent has the serious disadvantage that the eventual product contains a large amount of the diluent which must be removed eventually by distillation or other equally involved and expensive procedures.

This invention has as an object to provide an improved process of producing beta lactones continuously by a procedure which is both efficient and economical. A further object is to provide a continuous process for producing beta lactones in which the temperature of the reacting mixture may be controlled within such limits as to prevent polymerization or resinification of either reactants or product. A still further object is to provide a continuous process for the production of beta lactones in which provision is made for obtaining intimate contact of the reactants under temperature-controlled conditions. Another object is to provide a continuous process for the production of beta lactones, whereby the exothermic heat of reaction is absorbed without the use of diluents. Other objects will appear hereinafter.

These objects are accomplished by the following invention which, in its broader aspects, is based on the discovery that when a ketene (either an aldo ketene or a keto ketene) is condensed with a carbonyl compound free from olefinic or acetylenic bonds, such as an aldehyde, a ketone, diketone or a keto carboxylic ester in which compounds the carbonyl group is the sole available functional group, to form beta lactones, unusually high yields and commercially acceptable production rates can be attained by passing the gaseous ketene material and the vaporized carbonyl compound at reduced pressure and under temperature-controlled conditions continuously and countercurrently into contact with a circulating liquid stream composed of a solution of the beta lactone being produced and a catalytic agent which catalyzes the reaction between the ketene and the carbonyl compound. I have found that by adding the ketene and the carbonyl compound simultaneously, and preferably in equimolar amounts, in this manner, to the beta lactone-catalyst solution, continuously recycling the solution and continuously removing beta lactone from the solution, not only will the vigor of the condensation reaction be reduced, but a more regular liberation of heat will be obtained. Furthermore, the tendency of the reactants and product to condense or polymerize will be substantially reduced or eliminated and as a result the product will be substantially uncontaminated with polymerized or resinified bodies.

As exemplifying such a process in accordance with my invention, a gaseous stream consisting of equimolecular amounts of ketene and formaldehyde is passed upwardly in countercurrent to a stream of liquid beta lactone trickled down through a packed column of the scrubber-reactor type which is cooled to a temperature of $-50°$ C. to $+50°$ C. and maintained at a sub-atmospheric pressure, say, within the range of 10–250 mm. of mercury, preferably within the range of 40–100 mm.

In carrying out the process of our invention I may employ the compound generally referred to as ketene and having the formula $CH_2=C=O$, as well as any other aldo ketene or keto ketene, such compounds being represented by the graphic formula:

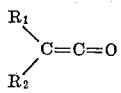

wherein $R_1$ is hydrogen, alkyl, aralkyl or aryl, and $R_2$ is hydrogen, alkyl (especially methyl and ethyl groups), aralkyl or aryl. Examples of typical ketenes are: methyl ketene, ethyl ketene, phenyl ketene, dimethyl ketene, diethyl ketene, diphenyl ketene, benzyl ketene and dibenzyl ketene.

As the carbonyl compound we may employ an aldehyde, a ketone, a diketone or a keto carboxylic ester. Such compounds may be represented by the graphic formula:

wherein $R_3$ is hydrogen, alkyl (especially methyl and ethyl groups), aralkyl, aryl or carbalkoxyl and $R_4$ is alkyl (especially methyl and ethyl groups), aralkyl or aryl. The carbonyl type of compound is typified by formaldehyde, acetaldehyde, acetone, methyl isopropenyl ketone, methyl ethyl ketone, acetophenone, benzaldehyde, methyl levulinate, methyl or ethyl acetoacetate, crotonaldehyde, phenyl acetaldehyde, dibenzyl ketone, benzophenone, ethyl benzoyl acetate, methyl or ethyl pyruvate and furfuraldehyde.

I have found that while the process herein described is applicable to the production of beta lactones generally by condensing the various ketenes mentioned above with the various carbonyl compounds, it is of particular value in the production of beta propiono lactone by condensing ketene ($CH_2=C=O$) with formaldehyde and in the production of beta butyro lactone by condensing ketene with acetaldehyde.

In carrying out the process of my invention the ketene and carbonyl compound in gaseous or vapor form, preferably in equimolecular amounts, are passed in countercurrent to the liquid stream of the beta lactone being produced. The beta lactone contains in solution an appropriate condensation catalyst, such as a Friedel-Crafts type catalyst, for example, zinc chloride, or a non-Friedel-Crafts type catalyst such as boric acid. The condensation reaction is thus caused to take place in the liquid stream which is conveniently provided by trickling the beta lactone liquid down through a cooled scrubber reactor maintained under reduced pressure.

A body of the beta lactone is maintained in a tank or reservoir and circulated by means of a pump, entering at the top of the reactor and descending by gravity to the bottom thereof, and thence back to the reservoir. Provision is made for maintaining the amount of catalyst in the reacting liquid at the desired value, say .1% to .3% of the total reaction mixture, by continuously or intermittently adding to the body of liquid beta lactone in the reservoir a solution of the catalyst in an inert solvent. As the reactants and catalyst solution are added an equivalent volume of solution containing a substantial proportion of the beta lactone is continuously withdrawn from the reservoir.

In the event a Friedel-Crafts type catalyst has been employed, the catalyst may be neutralized by the addition of a caustic such as sodium hydroxide. If a non-Friedel-Crafts type catalyst such as boric acid is employed, neutralization will in general be unnecessary. Thereafter, the beta lactone, substantially free from polymers or resinified materials may then be recovered from the solution by known procedures such as distillation under low temperature and reduced pressure.

In accordance with my invention the temperature of the reaction should be controlled within certain limits within the range of $-50°$ C. to $+50°$ C. In general, beta lactones of satisfactory quality may be produced at normally acceptable rates at a reaction temperature within the range of $0°$ C. to $25°$ C., although temperatures above or below these particular ranges and within the broad range may be employed with appropriate adjustment of the recycling rate, feed rates of ketene, carbonyl compound and of catalyst solution. I have found that by causing the condensation reaction between the ketene and the carbonyl compound to take place, under reduced pressure, in a stream of liquid beta lactone, the vigor of the condensation reaction is lessened and an even liberation of the exothermic heat results. In addition, causing the reaction to take place in a body of beta lactone itself and providing adequate cooling means for removal of the exothermic heat, the tendency of the ketene to dimerize or condense with the carbonyl compound, particularly the lower aliphatic aldehyde, to form undesired resinous materials is substantially eliminated.

It will, of course, be evident that the rate at which the ketene and carbonyl compound are added to the lactone solution, the rate or circulation, and the temperature of the reactor are mutually dependent, inasmuch as a variation in one may be counterbalanced by an appropriate change in one or both of the other variables. For example, a high rate of feed which would tend to increase the heat of reaction may be compensated for by an increase in the cycling rate or by lowering the jacket temperature of the reactor, or both.

In accordance with my invention the condensation reaction may be carried out in the presence of several different types of catalyst. In general these may be designated Friedel-Crafts catalyst and non-Friedel-Crafts catalyst.

Included in the first category of catalysts may be mentioned substances known to promote Friedel-Crafts reactions including, for example, the halides of boron, zinc, aluminum, tin, titanium and iron, as well as complexes of these halides with organic compounds such as ethyl ether, ethyl chloride, and the like.

In the second category of catalysts we may employ such catalysts as boric acid, an ester of boric acid and an alcohol, such as triethyl borate, or an acylated boric acid such as boron triacetate. Such catalysts can be represented by the following graphic formula:

wherein $R_5$ represents a hydrogen atom, an alcohol radical (especially methyl, ethyl, n-propyl, n-butyl, and isobutyl groups, i. e., a primary alkyl group of the formula $C_nH_{2n+1}$ wherein $n$ represents a positive integer of from 1 to 4) and an acyl group (especially an acetyl or propionyl group).

Typical boron compounds formulated above include boric acid, trimethyl borate, triethyl borate, tri-n-propyl borate, tri-n-butyl borate, triacetyl boric acid and tripropionyl boric acid. Acylated boric acids are formed upon bringing boric acid into contact with a ketene. Boric acid is advantageously employed as the catalyst.

The amount of catalyst employed may vary over a rather wide range, but in general we prefer to maintain in the reaction mixture an amount of catalyst corresponding to .1% to 3% of the total reaction mixture, that is, the mixture of beta lactone, all reactants, plus solvent, if any. The catalyst is preferably introduced in the form of a solution in a solvent which is inert with respect both to the reactants and the beta lactone produced. A satisfactory catalyst solution may, for example, be a 10% acetone solution of zinc chloride or other Friedel-Crafts type of catalyst introduced at such a rate that the reaction mixture will contain .1% to .3% of the catalyst. Alternatively, a 10% acetone solution of boric acid, a boric acid ester, or an acylated boric acid may be employed with equal effectiveness.

In the following examples and description I have set forth several of the preferred embodiments of my invention, but they are included merely for purposes of illustration, and not as a limitation thereof.

The single figure of the drawing is a diagrammatic illustration in the nature of a flow sheet of one form of apparatus in which the condensation of various ketenes with various carbonyl compounds to produce beta lactones may be carried out in accordance with my invention.

*Example 1*

Referring to the drawing, numeral 1 designates a reactor which may be of the scrubber-reactor type. The reactor comprises a cylindrical shell constructed of copper, stainless steel or other suitable metal which may conveniently have a height of 6 feet and an inside diameter of 11 inches. The shell of the reactor is provided at each end with flanges 2 and 3, respectively. Flange 2 is bolted or otherwise secured to flange 4 of a dome-shaped cap 5 forming the top of the scrubber unit. Inserted between and held in place by flanges 2 and 4 is a dispersion plate 6, the function of which will be explained hereinafter.

Flange 3 is bolted or otherwise secured to flange 7 of tubular section 8 forming the bottom of the reactor column unit. Inserted between flanges 3 and 7 is a packing support 9 which may conveniently take the form of a wire screen, perforated metal plate, or the like, of sufficient strength to support a charge of packing material placed in the scrubber which, in this instance, may be Berl saddles or Raschig rings 10.

Scrubber 1 is provided with cooling means which may take the form of a cooling coil 11 centrally disposed therein as illustrated, through which is circulated a cooling medium as, for example, glycol, maintained at the desired temperature, the medium being introduced through inlet 12 and finding its way out of the coil via outlet 13.

Scrubber 1 has an outlet which may take the form of valved conduit 14 communicating through sight glass 15 with storage tank 16. The scrubber is also provided with auxiliary outlet or overflow means in the form of conduits 17 and 18 which communicate with valved conduit 19 which, similarly to conduit 14, connects through sight glass 20 with storage tank 16.

Tank 16 is provided with means for introducing thereinto a catalyst solution in metered amounts, said means taking the form of valved conduit 21 provided at its upper end with funnel 22. This tank is also provided with a sight glass 23 connected to the interior of the tank by valved pipe sections 24 and 25. Provision is made for draining tank 16, if desired, through valved conduit 26.

In order to provide means for continuous or intermittent removal of fluid therefrom, tank 16 is also provided with overflow conduit 27 connecting through an atmospheric leg or seal 28 to a metering device (not shown) through the agency of which beta lactone solution may be removed in amounts equivalent to the amount of material added to the solution.

Tank 16 is connected through valved conduit 29 to the top of scrubber 1 through an atmospheric leg, circulating pump 39, conduit 40, rotameter 41, conduit 42 and conduit 43. Conduit 42 is provided, as shown, with a cooling device which may take the form of a concentric shell 44 through which is circulated a cooling medium such as glycol, the cooling medium entering through inlet 45 and emerging through outlet 46.

Means is provided for introducing gaseous or vaporized reactants into the lower part of the scrubber, said means taking the form of valved conduit 47 and conduit 48. Both conduits 47 and 48 are provided with rotameters 49 and 50, respectively, the latter being provided with heating jacket 51, as shown, to provide for maintaining in the vapor phase the material which is vaporized in vaporizer 52.

The gaseous or vaporous reactants mingle in conduit 53 and are thence conveyed into section 8 of the scrubber. The scrubber is provided with means for the escape of unreacted or uncondensable gases therefrom, said means taking the form of conduit 54 which connects the interior of the dome-shaped cap 5 with gas separator 55, through condenser 56, the cooling medium for which, for example, glycol, is introduced through inlet 57 and withdrawn through outlet 58. Condensate and gases from the condenser pass through conduit 59 into liquid-gas separator 55, thence, after separation of gases, through liquid seal 60 and check valve 60a, back into the stream of liquid circulating through conduits 42 and 43. Uncondensable gases pass out of the system through conduit 61.

Reduced pressure is maintained within the scrubber-reactor and other parts of the system as a feature of my invention by means of a vacuum pump or a jet (not shown) connected to conduit 61, the reduction in pressure being transmitted to the reactor through conduit 59, condenser 56 and conduit 54.

If desired, the off gases passing through conduit 61 may be scrubbed by passing them through a water scrubber connected into the line between the liquid-gas separator and the source of vacuum, for the purpose of recovering any values they may contain.

A storage tank 62 connected through valved conduit 63 and proportioning pump 64 with conduit 42, is provided for supplying catalyst solution in metered amounts to the stream of beta lactone solution passing through 42.

The process of condensing ketenes with carbonyl compounds to form beta lactones in accordance with my invention may be carried out in this apparatus as follows:

Tank 16 is charged with, say, 5 gallons of the beta lactone it is desired to produce containing in solution 50 grams of zinc chloride. In a given apparatus this will be sufficient to bring the level in tank 16 to that indicated by the dotted horizontal line extending across the tank at approximately the height of overflow conduit 27, as shown by sight glass 23.

Pump 39 is started and the beta lactone is pumped at the rate of 2.2 gallons per minute from tank 16 through conduit 40, rotameter 41, conduit 42, condenser 44 and conduit 43 into the dome-shaped cap 5 forming the top of reactor 1. The liquid falls upon the dispension plate 6 through the openings in which it trickles down onto the packing material of the reactor, which may be Berl saddles or Raschig rings, thereafter descending by gravity to the bottom of the reactor, thence through conduit 14 and sight glass 15 to tank 16, thus making a complete cycle through the apparatus.

Catalyst is preferably continuously introduced, in the form of a solution in an inert solvent such as acetone, into the circulating beta lactone in such metered amounts as to maintain in the solution a catalyst content of .1% to .3%, based on the total reaction mixture.

Once the circulation of beta lactone is started as indicated above, ketene gas is introduced into the circulating stream, through valved conduit 47 and rotameter 49. Vaporizer 52 is charged with a suitable source of carbonyl compound, as for example, paraformaldehyde and heat is applied. The paraformaldehyde vaporizes, breaking up into monomeric formaldehyde which passes through jacketed rotameter 50 and conduit 48 to mingle, in equimolecular amounts, with the ketene introduced through rotameter 49. A suitable heat exchange medium heated to a temperature sufficient to maintain the formaldehyde in the vapor phase is circulated through jacket 51. The mixture of gases in 53 passes into and upwardly through the reactor in countercurrent to the descending stream of liquid beta lactone trickling down over the reactor packing material.

The reaction between the ketene and formaldehyde commences immediately upon introduction of the reactants into the bottom of the reactor and continues as the gases rise to the top thereof. As the stream of beta lactone descends it picks up and dissolves the beta lactone reaction product which is thus continually formed and carries it by gravity into tank 16 from which a portion is continuously removed through overflow 27, as previously explained.

In accordance with my invention the interior of the reactor is cooled by circulating a cooling medium such as cold water, brine or glycol through coil 11. The reaction, which is strongly exothermic, is thus carried out under temperature-controlled conditions and at reduced pressure in a continuous and cyclic manner.

Since the gaseous mixture passes substantially to the top of the reactor it may happen that a small amount of unreacted ketene and formaldehyde will pass out of the reactor at the top, together with a certain amount of the beta lactone solution which may be vaporized. Furthermore, certain incondensable gases may be formed as a result of side reactions. Provision is therefore made for conveying these materials out of the apparatus via conduit 54. Any vaporized beta lactone which may have thus been conveyed out of the system is condensed in condenser 56, the condensate, together with the incondensable gases, passing downwardly through conduit 59 into liquid-gas separator 55. Here the gases are separated from the condensate and pass out of the system by conduit 61, while the condensate itself is returned to the circulating stream of beta lactone via conduit 60.

In accordance with my invention the temperature of the reaction carried out in reactor 1 is controlled within the range of $-50°$ to $+50°$ C. by keeping the temperature of the heat exchange medium circulating through coil 11 at the proper temperature. As previously indicated, the condensation reaction is caused to take place at subatmospheric pressures. While pressures as low as 10 mm. of mercury, or as high as 250 mm. or even higher, are operative, I prefer in general to operate at pressures within the range of 40 to 100 mm. I have found that by carrying out the reaction in a scrubber-type reactor under these conditions, where the lactone solution is continuously circulated in countercurrent to the gaseous reactants, the heat of reaction can be conducted away evenly, thus avoiding high local concentrations of ketene or carbonyl compound which would otherwise result in loss in yields because of the tendency of the materials to form polymers or resinified products. The use of reduced pressure greatly lessens these polymerization tendencies and promotes the smoothness and regularity of the condensation reaction. As a result the beta lactone will be produced in a high state of purity.

As the beta lactone liquid descends in reactor 1 it tends to accumulate in the bottom of section 8 thereof. Provision is made for continuously withdrawing the accumulated liquid from the bottom of section 8 principally via conduit 14, through which it finds its way into the tank or reservoir 16. Preferably the liquid should not rise much beyond the level indicated by the line $a—a$. Such a level will be maintained by draining the liquid back to tank 16 via conduit 19. To provide for draining the tank at an even higher level such as that indicated by the line $b—b$, conduit 17 is provided which drains into conduit 19.

A sufficient amount of the reaction mixture is continuously withdrawn from tank 16 through conduit 27 and seal 28 to compensate for or balance the increase in the liquid volume due to introduction of the reactants and catalyst solution. The level of liquid in tank 16 can, of course, be determined at all times by observing the level of liquid in sight glass 23. While no hard and fast rule can be laid down as to the recycling rate, under ordinary conditions, such as those described above, I find that when the beta lactone solution is cycled through the apparatus at the rate of 2.2 gallons per minute, a beta lactone product of excellent quality may be produced at satisfactory production rates.

In a typical run the reserve tank 16 was charged with a solution of 50 grams of zinc chloride in 5 gallons of beta propiono lactone and circulated through the system in the manner described above. The pressure was held at 45 mm. The reaction temperature was held at 0–5° C. In a 48-hour run 3.5 grams of ketene per minute and 2.5 grams of formaldehyde per minute were mixed immediately before entering the scrubber. An analysis of a composite sample indicated that it contained 78% by weight beta propiono lactone, 12% acrylic acid and 10% residue. The beta propiono lactone product had a boiling point at 10 mm. of 51° C., a refractive index of 1.4130 and a density at 20° C. of 1.1545.

*Example 2*

The reserve tank 16 was charged with 5 gallons of beta butyro lactone containing 50 grams of zinc chloride and the solution was circulated through the system in the manner described above. The pressure at 53 was maintained at about 90 mm. and at 61 at approximately 38 mm. The reaction temperature was held at −5° C. to 0° C. In a 48-hour run 8240 grams of ketene and 8400 grams of acetaldehyde were added to the reactor. A 74% yield of beta butyro lactone having a boiling point at 10 mm. of 54° C. was obtained.

It will, of course, be understood that many variations in the process and apparatus described above may be made within the scope of my invention. For example, the rates of feed, rate of recycling, and the quantities of materials introduced into the cyclic system, and likewise the amounts of materials withdrawn therefrom, can be varied over wide ranges without materially altering the results attained.

Similarly, the reaction temperatures and the pressure in the reactor may vary depending upon the type of reactants employed, the particular beta lactone being manufactured, the rate of recycling, and various other factors. In general, as stated, the reaction temperature should be kept within the range of −50° to +50° C., and preferably within the range of 0°–20° C., and the pressure within the range of 10–250 mm. and preferably within the range of 40–100 mm. since I have found that carrying out the process under such circumstances obviates or minimizes the formation of undesired resinified or polymerized products which would otherwise contaminate the desired beta lactone product. For the preparation of propiono and butyro lactones the temperature is preferably kept above −25° C. and within the range −25° C. and +25° C.

As will be seen from the above description, my process of producing beta lactones is particularly characterized by the fact that the reaction between the ketene and the carbonyl compound is carried out under reduced pressure. In view of the fact that the condensation of ketene and a carbonyl compound takes place with a decrease in volume and should, therefore, be favored by an increase in pressure, it is wholly novel and unexpected to find that this condensation actually takes place equally well at reduced pressure while at the same time the polymerization tendency of the ketene and the tendency of the carbonyl compound to condense with itself are eliminated or substantially lessened. I have also found that the use of reduced pressure has the further advantage, particularly in the production of beta propiono lactone, of stabilizing the product since beta propiono lactone is readily polymerized by heat and/or pressure to form undesired polymeric products. Not only am I enabled to obtain exceptionally high yields, running on the average between 75% and 95%, but my process affords a simple and highly efficient means of obtaining beta lactones continuously and at commercially practicable production rates. Thus, one of the outstanding features of my invention is that it makes possible the obtaining of the beta lactone product in substantially pure form free from undesired polymers and resinified materials and other high-boiling contaminants.

Another important advantage of my invention is that by causing the reaction between the ketene and the carbonyl compound to take place in a solution or body of beta lactone, an efficient means of keeping down and controlling the exothermic heat is afforded, with its many attendant operating advantages. My process is also a marked improvement over the batch procedure heretofore employed, not only because it is far more economical and practical, but also because it obviates the necessity for separating the beta lactone product from the large amounts of inert diluents or solvents made necessary by batch operation. Many other advantages will be apparent to those skilled in the art.

What I claim is:

1. The process of producing beta lactones by condensing a ketene with a compound containing a carbonyl group and having the graphic formula:

wherein $R_3$ is a substituent selected from hydrogen, alkyl, aralkyl, aryl and carbalkoxyl groups and $R_4$ is a substituent selected from hydrogen, alkyl, aralkyl and aryl groups as the sole functional group, which comprises continuously passing a gaseous mixture of the ketene and the carbonyl compound at a reduced pressure within the range of 10–250 mm. countercurrently to a circulating stream of beta lactone containing a condensation catalyst, controlling the temperature of the beta lactone stream within the range of −50° C. to +50° C., collecting the beta lactone product which is formed in the condensation reaction in solution in the beta lactone stream, adding condensation catalyst to the beta lactone being circulated and removing from said solution a portion of beta lactone solution corresponding in amount to the amount of the reactants and catalyst introduced.

2. Process of producing beta lactones by condensing a ketene with a compound containing a carbonyl group and having the graphic formula:

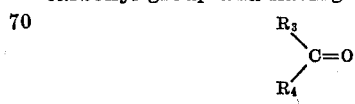

wherein $R_3$ is a substituent selected from hydrogen, alkyl, aralkyl, aryl and carbalkoxyl group and $R_4$ is a substituent selected from hydrogen, alkyl, aralkyl and aryl groups as the sole functional group, which comprises continuously passing a gaseous mixture containing equimolecular amounts of a ketene and a carbonyl compound at a reduced pressure within the range of 10–250 mm. countercurrent to a circulating stream of liquid beta lactone containing a condensation catalyst, controlling the temperature of the beta lactone stream within the range of −50° C. to +50° C., collecting the beta lactone product which is formed in the condensation reaction in solution in said beta lactone stream, adding said condensation catalyst to the circulating beta lactone and removing from the beta lactone solution a portion thereof corresponding in amount to the amount of the reactants and catalyst introduced.

3. Process of producing beta lactones by condensing a ketene with a compound containing a carbonyl group and having the graphic formula:

wherein $R_3$ is a substituent selected from hydrogen, alkyl, aralkyl, aryl and carbalkoxyl groups and $R_4$ is a substituent selected from hydrogen, alkyl, aralkyl and aryl groups as the sole functional group, which comprises continuously passing a gaseous mixture of a ketene and a carbonyl compound at reduced pressure within the range of 10–250 mm., countercurrently to a circulating stream of beta lactone containing a boron condensation catalyst controlling the temperature of the beta lactone stream within a range of −50° C. to +50° C., collecting the beta lactone product which is formed in the condensation reaction in solution in said beta lactone stream, adding boron condensation catalyst to the circulating beta lactone and removing from the recycling solution a portion thereof corresponding in amount to the amount of the reactants and catalyst introduced.

4. The process of producing beta propiono lactone by condensing ketene with formaldehyde, which comprises continuously passing a gaseous mixture of ketene and formaldehyde at a reduced pressure within the range of 10–250 mm. countercurrently to a circulating stream of beta lactone containing a condensation catalyst, controlling the temperature of the beta lactone stream within the range of −50° C. to +50° C., collecting the beta propiono lactone product which is formed in the condensation reaction in solution in the beta lactone stream, adding condensation catalyst to the circulating beta lactone and removing from the recycling solution a portion thereof corresponding in amount to the amount of the reactants and catalyst introduced.

5. The process of producing beta butyro lactone by condensing ketene with acetaldehyde, which comprises continuously passing a gaseous mixture of ketene and acetaldehyde at a reduced pressure within the range of 10–250 mm. countercurrently to a circulating stream of beta lactone containing a condensation catalyst, controlling the temperature of the beta lactone stream within the range of −50° C. to +50° C., collecting the beta butyro lactone product which is formed in the condensation reaction in solution in the beta lactone stream, adding condensation catalyst to the circulating beta lactone and removing from the recycling solution a portion thereof corresponding in amount to the amount of the reactants and catalyst introduced.

HERBERT G. STONE.

REFERENCES CITED

The following references are of record in the file of this patent:

UNITED STATES PATENTS

| Number | Name | Date |
|---|---|---|
| 2,356,459 | Kung | Aug. 22, 1944 |
| 2,424,589 | Steadman | July 29, 1947 |